US011842501B2

(12) United States Patent
VanSickle

(10) Patent No.: US 11,842,501 B2
(45) Date of Patent: *Dec. 12, 2023

(54) METHODS AND SYSTEMS OF TRACKING VELOCITY

(71) Applicant: Velo Software, LLC, Denver, CO (US)

(72) Inventor: David VanSickle, Denver, CO (US)

(73) Assignee: Velo Software, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,821

(22) Filed: Dec. 6, 2021

(65) Prior Publication Data

US 2022/0092794 A1    Mar. 24, 2022

Related U.S. Application Data

(63) Continuation of application No. 16/815,457, filed on Mar. 11, 2020, now Pat. No. 11,205,273.
(Continued)

(51) Int. Cl.
*G06T 7/254* (2017.01)
*G06T 7/285* (2017.01)
*G06T 7/262* (2017.01)

(52) U.S. Cl.
CPC ............. *G06T 7/254* (2017.01); *G06T 7/262* (2017.01); *G06T 7/285* (2017.01); *G06T 2207/20056* (2013.01)

(58) Field of Classification Search
CPC ......... G06T 7/254; G06T 7/285; G06T 7/262; G06T 2207/20056; G06K 9/00342; G01P 3/38; G01P 3/80
See application file for complete search history.

(56) References Cited

U.S. PATENT DOCUMENTS 3,967,500 A * 7/1976 Forster .................... G01F 1/58
                                                    73/861.06
4,661,849 A * 4/1987 Hinman .................. G06T 7/223
                                                    375/240.16
(Continued)

FOREIGN PATENT DOCUMENTS

DE    102008053472 B4 * 10/2018 ......... G06K 9/00805
DE    102008053472 B4    10/2018
(Continued)

OTHER PUBLICATIONS

FaceNet: A Unified Embedding for Face Recognition and Clustering Florian Schroff, Dmitry Kalenichenko, James Philbin; Proceedings of the IEEE Conference on Computer Vision and Pattern Recognition (CVPR), 2015, pp. 815-823 (Year: 2015).*
(Continued)

*Primary Examiner* — Charles T Shedrick
(74) *Attorney, Agent, or Firm* — Jason H. Vick; Sheridan Ross, PC

(57) ABSTRACT

Systems and methods for determining a velocity of a fluid or an object are described. Systems and methods include receiving image data of the fluid or the object, the image data comprising a plurality of frames. Each frame comprises an array of pixel values. Systems and methods include creating a frame difference by subtracting an array of pixel values for a first frame of the image data from an array of pixel values for a second frame of the image data. Systems and methods include measuring a difference between a location of the object in the first frame of the image data and the second frame of the image data. Systems and methods include creating a correlation matrix based on the measured difference. Systems and methods include using the frame difference and the correlation matrix to automatically determine the velocity of the fluid or the object.

21 Claims, 6 Drawing Sheets

Related U.S. Application Data

(60) Provisional application No. 62/816,420, filed on Mar. 11, 2019.

(56) References Cited

U.S. PATENT DOCUMENTS

| | | | | |
|---|---|---|---|---|
| 5,828,848 | A * | 10/1998 | MacCormack | G08B 13/1968 709/247 |
| 6,452,972 | B1 * | 9/2002 | Ohara | H04N 7/012 348/E5.065 |
| 8,233,031 | B2 | 7/2012 | Saito | |
| 11,205,273 | B2 | 12/2021 | VanSickle | |
| 2013/0265434 | A1 * | 10/2013 | Iwamoto | G06K 9/00342 348/157 |
| 2015/0324636 | A1 * | 11/2015 | Bentley | A63F 13/00 386/227 |
| 2017/0235267 | A1 * | 8/2017 | Kobayashi | G03G 15/657 399/16 |
| 2019/0147219 | A1 * | 5/2019 | Thornbrue | G06T 7/73 348/169 |
| 2020/0294251 | A1 * | 9/2020 | VanSickle | G06T 7/254 |
| 2021/0142048 | A1 * | 5/2021 | Radwin | G06K 9/00369 |

FOREIGN PATENT DOCUMENTS

| | | | | |
|---|---|---|---|---|
| EP | 3121791 A1 * | 1/2017 | | G06T 7/20 |
| EP | 3121791 A1 | 1/2017 | | |
| WO | WO 2014/152601 | 9/2014 | | |
| WO | WO-2014152601 A1 * | 9/2014 | | G06K 9/00342 |
| WO | WO 2017/011814 | 1/2017 | | |
| WO | WO 2017/011817 | 1/2017 | | |
| WO | WO 2017/011818 | 1/2017 | | |
| WO | WO-2017011814 A1 * | 1/2017 | | G06K 9/00342 |
| WO | WO-2017011817 A1 * | 1/2017 | | A61B 5/6803 |
| WO | WO-2017011818 A1 * | 1/2017 | | G06K 9/0055 |
| WO | WO 2020/159386 | 8/2020 | | |
| WO | WO-2020159386 A1 * | 8/2020 | | G06K 9/3233 |

OTHER PUBLICATIONS

Pava, D.F. (2011). Object Detection and Motion Analysis in a Low Resolution 3-D Model. Ninth LACCEI Latin American and Caribbean Conference (LACCEI'2011), Engineering for a Smart Planet, Innovation, Information Technology and Computational Tools for Sustainable (Year: 2011).*

Schatzman, James C., Accuracy of the Discrete Fourier Transform and the Fast Fourier Transform, SIAM Journal on Scientific Computing, 1996 17:5, 1150-1166 (Year: 1996).*

Schroff, Florian et al. "FaceNet: A Unified Embedding for Face Recognition and Clustering" Proceedings of the IEEE Conference on Computer Vision and Pattern Recognition (CVPR); 2015; pp. 815-823.

Pava, Diego F. et al. "Object Detection and Motion Analysis in a Low Resotution 3-D Model" Ninth LACCEI Latin American and Caribbean Conference; Aug. 3-5, 2011.

Schatzman, James C. "Accuracy of the Discrete Fourier Transform and the Fast Fourier Transform" Society for Industrial and Applied Mathematics; vol. 17, No. 5, pp. 1150-1166; Sep. 1996.

Notice of Allowance for U.S. Appl. No. 16/815,457, dated Oct. 6, 2021.

* cited by examiner

METHODS AND SYSTEMS OF TRACKING VELOCITY

RELATED APPLICATION DATA

This application is a Continuation of U.S. patent application Ser. No. 16/815,457, filed Mar. 11, 2020, now U.S. Pat. No. 11,205,273, which claims the benefit of and, under 35 U.S.C. § 119(e), priority to U.S. Provisional Patent Application No. 62/816,420, filed Mar. 11, 2019, entitled "SMARTPHONE-BASED AUTOMATIC VELOCITY MEASUREMENT," each of which are incorporated herein by reference in their entirety.

FIELD

The present disclosure is generally directed toward systems and methods of tracking velocity of objects and fluids and more particularly to the use of a camera to determine a velocity of an object or fluid.

BACKGROUND

Automatic velocity measurement with a camera-based system has been performed for some time. With the advent of widely available and computational powerful camera phones, interest in camera-based measurement has increased.

For the measurement of a baseball pitch velocity, conventional systems and methods include simple user activated timers. In such systems, speed of a baseball thrown by a pitcher is calculated using a known value of a distance from the mound to the plate. Such conventional systems and methods suffer from latency due to requiring user activation. In addition, the distance from the pitcher's hand to the catcher's glove may not be the same as from the pitching rubber to the plate. As such, the use of the distance from the mound to the plate in calculating the velocity of the thrown baseball inevitably causes inaccuracy. Other conventional systems include recording high speed video and requiring a user to manually search through the frames to find a starting and ending point over a known distance. Some conventional systems do automatically calculate baseball speeds but work only from a fixed location. Such systems cannot be used handheld which greatly limits use.

DETAILED DESCRIPTION

What is needed is a system for tracking velocity of objects and/or velocity which provides the ability to detect a moving object against a moving background. As disclosed herein, a system for tracking velocity of objects and/or velocity which provides the ability to detect a moving object against a moving background may be executed using a user device such as a smart phone. Using algorithmic improvements to conventional systems, the systems and methods as described herein can be utilized for a wide variety of additional applications on both commonly available and custom hardware architectures. These and other operations may be as described in greater detail below.

Figure 1:
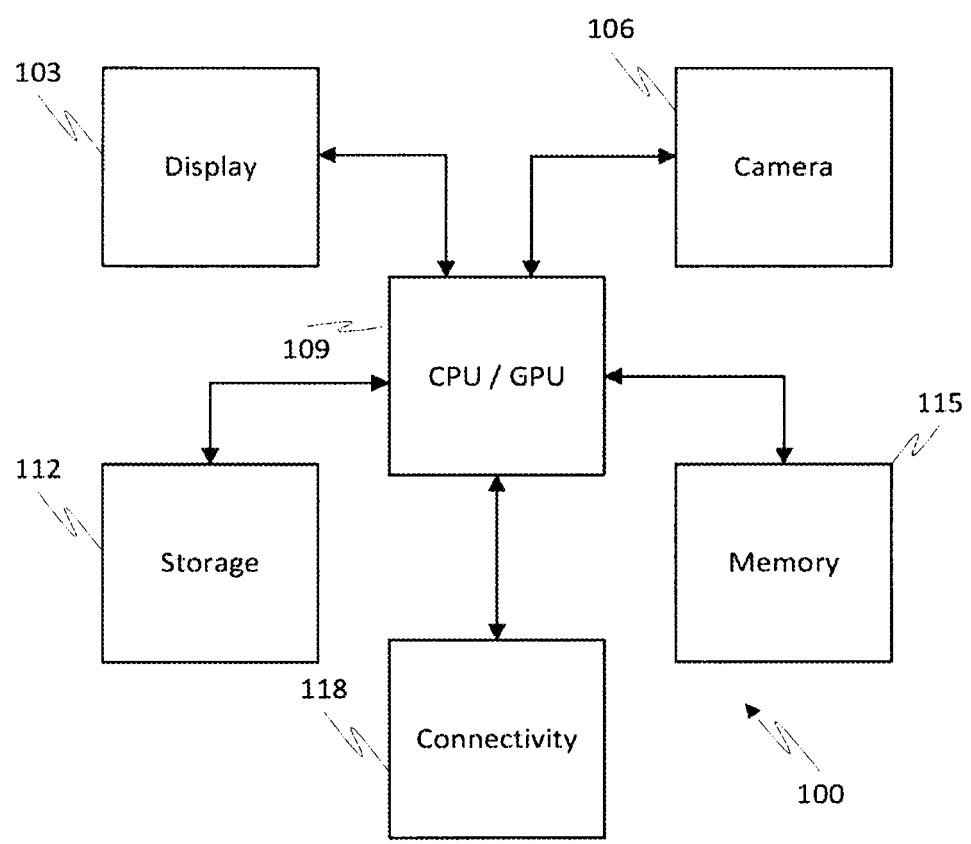
FIG. 1 is a block diagram of a velocity tracking system in accordance with one or more of the embodiments presented herein.

Certain embodiments of the present disclosure may be implemented using a computer system 100 as illustrated in FIG. 1. A computer system 100 may comprise a display device 103, a camera 106 such as a digital camera, a CPU and/or a GPU 109, a storage device 112, a memory device 115, and one or more means of connectivity 118. In some embodiments, a gate array, additional memory, storage devices, connectivity systems, and additional displays may be used depending on application.

In some embodiments, methods and systems may be executed using a smartphone such as an iPhone or a tablet such as an iPad. For example, an application executing on a smartphone, tablet, or other user device may be capable accessing a camera of the smartphone, tablet, or other user device and implementing one or more of the embodiments described herein. It should be appreciated, however, that certain embodiments may be implemented using a variety of types of devices or using custom hardware.

Computer systems 100 may in some embodiments comprise personal computers, laptops, tablet devices, smartphones, or any other type of device capable of executing an application or Internet browser. In some embodiments, a system or method may be executed within a browser window such as Internet Explorer™, Google™ Chrome™, Firefox™, etc. and may be implemented using a Javascript™ application.

A CPU or GPU 109 can be or may include any hardware processor, such as a Digital Signaling Processor (DSP), an application specific processor, a microcontroller, a multi-core processor, and/or the like. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

A memory device 115 may be any computer readable storage medium, such as a memory (i.e., a computer memory, a hard disk, and/or the like). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer system 100 may further comprise one or more communication systems which can be or may include any hardware interface coupled with software that can communicate with a network. For example, a communication system can be a wireless interface, a wired interface, a fiber optic interface, an Ethernet interface, a cellular interface, a WiFi interface, and/or the like.

A computer system 100 may also include one or more input/output systems which can be or may include any type of hardware interface coupled with software that can communicate with a user of the computer system 100. For example, keyboard, mouse, display screen, microphone, speaker, etc.

User interface elements described herein can be or may include any type of user interface element that can be displayed/sounded by a browser such as a button, a window, a pane, panel, a menu, a menu item, an icon, a tab, a text object, a text entry object, a scroll bar, a slider, a cursor, a picture, a video, a sound object, a vibration object, and/or the like.

In some embodiments, a system for tracking velocity of fluid or an object may comprise a computer system executing one or more user interfaces on a display of a user device. User interfaces may be as illustrated in FIGS. 2 and 3.

Figure 2:
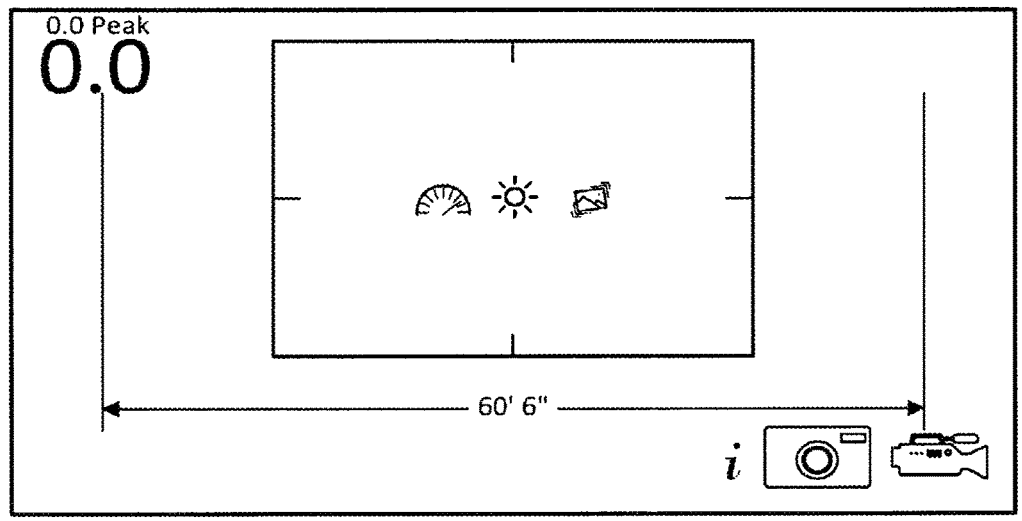
FIG. 2 is an illustration of a user interface in accordance with one or more of the embodiments presented herein.
Figure 3:
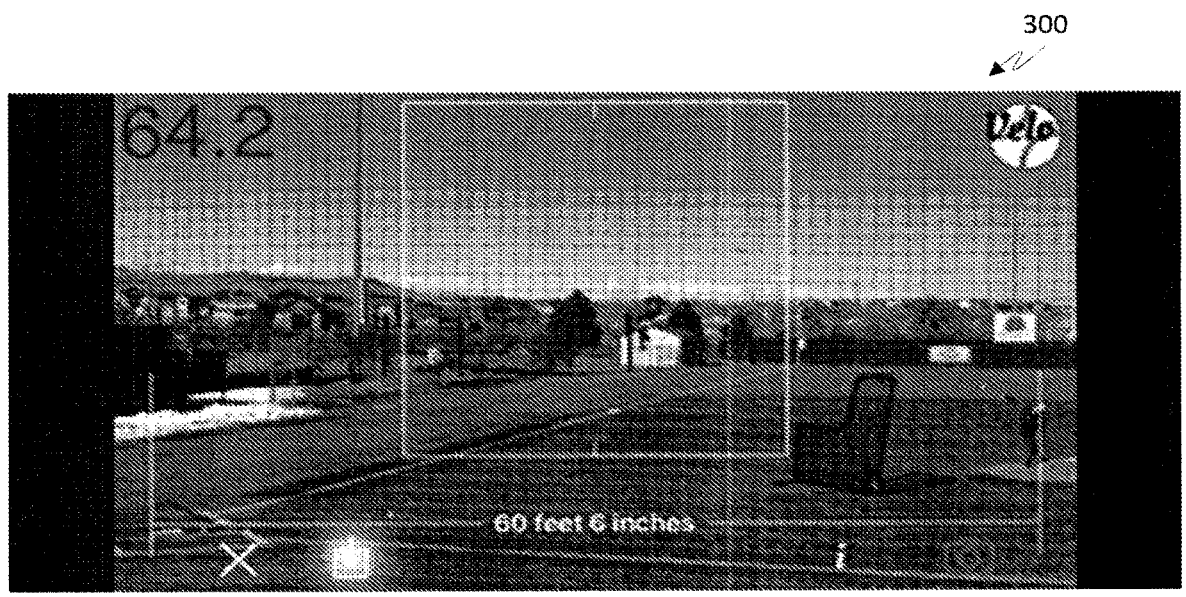
FIG. 3 is an illustration of a user interface in accordance with one or more of the embodiments presented herein.

For example, as illustrated in FIG. 2, a user interface 200 may comprise a number of visual elements such as a speed display, a brightness status indicator, a throttling status indicator, a shake status indicator, an active window box, distance marks, and dimension display.

Distance marks displayed in the user interface 200 may be graphical indices which may be used by a user to position the camera system and adjust the zoom of the camera system to mark a known distance. For example, when recording a baseball pitch as illustrated in FIG. 3, the camera may be adjusted and positioned such that the distance marks may overlay a pitcher block and a home plate which may have a known or estimated distance, for example 60 feet and 6 inches.

A dimension display may be displayed in the user interface 200. The dimension display may include a user-selectable field which may enable a user to input a distance. In some embodiments, the distance may be a set distance depending on application or may include a drop-down box or other type of menu to allow a user to select from a number of predetermined choices.

The active window box displayed in the user interface 200 may be an area of the user interface 200 between the distance marks through which an object or fluid to be surveyed may be expected to travel. For example, in the case of a baseball pitch, the active window box may surround an area between the pitcher's mound and the plate.

A speed display may show a speed of an object or fluid at a moment of capture which is the median speed of a sequence of measurements. For example, a processor of a computer device executing a system as described herein may be capable of interpreting frames of data and outputting a median speed of an object or fluid visualized in the data. The speed output by the system may be displayed in a user interface 200 as illustrated in FIG. 2.

In some embodiments, the system may be capable of using a formula for a decline in speed due to air resistance as an object or fluid progresses across the field of view. Furthermore, the system may be capable of determining, estimating, or detecting a peak speed of an object or fluid. The peak speed may be displayed along with the median speed in the user interface 200.

A brightness indicator may appear in a displayed user interface 200. For example, a processor of a computer device executing a system as described herein may be capable of detecting whether enough light exists to reliably make a velocity measurement. If the processor determines not enough light exists to reliably make a velocity measurement the processor may display a brightness indicator in a user interface.

A throttling icon may be displayed in the user interface 200 if the processor determines the processor cannot keep pace with image processing demands. If and when the processor determines the processor cannot keep pace with image processing demands, the processor may initiate a throttling routine as an effort to maintain system functions. For example, throttling may occur if the temperature of the processor is excessive due to ambient conditions, extended use, or other causes. Throttling may also occur if the processor is busy with background tasks.

In some embodiments, a shake icon may be presented in a user interface 200 to indicate to a user when a processor determines there is too much movement of the camera system to make a velocity measurement. For example, a camera system may be designed to be used in a handheld manner; however, in some scenarios, such as when a relatively higher zoom is required or if a user has trouble holding the camera system (such as an iPhone or iPad) still, the user interface 200 may display a shake icon to suggest to the user to consider using a tripod or otherwise hold the camera system still.

In some embodiments, a snapshot capture icon may be presented in a user interface 200. Like other icons displayed in a user interface 200, the snapshot capture icon may be selectable by a user of the computer system. When the snapshot capture icon is selected, the processor of the computer system may begin to capture a series of still images. In some embodiments, the processor may be capable of waiting until movement is detected prior to capturing the still images. For example, as illustrated in FIG. 3, a user using a computer system to measure speeds of baseballs thrown by a pitcher may view a user interface 300. Upon selecting the snapshot capture icon, a next baseball thrown by the pitcher may be automatically captured in over 200 stop-action snapshots.

In some embodiments, a video capture icon may be presented in a user interface 200. The video capture icon may be selectable by a user of the computer system. When the video capture icon is selected, the processor of the computer system may begin to record a video. In some embodiments, the processor may be capable of waiting until movement is detected prior to capturing the video. In some embodiments, the processor may be capable of recording into memory video beginning a period of time prior to the instant motion is detected until a period of time following the end of movement. For example, in the baseball scenario illustrated in FIG. 3, a next thrown baseball may automatically be captured as a video starting 1.3 seconds prior to the throw and 1.7 seconds after the catch. In some embodiments, the timing of the video may be centered around the time the video capture icon is selected. For example, video may be recorded starting 1.3 seconds prior to the icon being selected and ending 1.7 seconds after the icon is selected. In this way, a user may be enabled to select the video capture button at any time during a throw or immediately before or after the throw and the video should capture the entire throw until the catch of the ball.

As still images, snapshots, videos, etc., are captured by a user, the user may be enabled to use the computer system display to select from recorded images and videos. The user may be capable of selecting one or more images, snapshots, videos, etc., and selecting a download icon presented in a user interface 300 as illustrated in FIG. 3. After selecting one or more images or videos and selecting the download icon, the selected one or more images or videos may be saved to a camera roll on the computer system such as an iPhone or iPad. During the image and/or video selection and downloading process, a download or selection user interface may be presented. After saving to the camera roll, the user interface 200 may reappear. The computer system may enable users to share downloaded images and/or videos to other users or to post the videos and/or images as media on social media websites.

In some embodiments, when a user selects the snapshot capture icon, multiple snapshots may be recorded starting just prior to the velocity being captured and ending after the velocity has been captured. Using a user interface 300 as illustrated in FIG. 3, the user may be capable of selecting between the plurality of captured snapshots by panning his or her finger side-to-side across the screen. In some embodiments, other methods may be used to select between many snapshots.

If the user decides not to save any images or videos to the camera roll, the user may select a close button in the user interface 300 to return to the user interface 200 illustrated in FIG. 2.

Performance Compared to Contemporary Devices

To determine the effectiveness of the systems and methods of velocity measurement as described herein, a simple comparison was performed between a computer system executing a method in accordance with one or more of the embodiments presented herein and a contemporary method of tracking the velocity of baseball pitches. Six pitches were thrown with a stop-action snapshot activated as described herein. The computer system executing a method in accordance with one or more of the embodiments presented herein counted a number of frames that the ball took to cross the active window. Knowing the framerate (for example 120 Hz), and the distance across the active window (for example 60 feet and 6 inches), the computer system executing a method in accordance with one or more of the embodiments presented herein converted the number of frames to a velocity. As illustrated in Table 1, below, error when using exemplary methods as described herein is consistently lower than error when using a contemporary method. Using the contemporary method the average error was 4.27% while the error when using an exemplary method as described herein was only 1.79%. As can be appreciated, using systems and methods as described herein may result in consistently more accurate velocity measurements.

In implementing certain embodiments of the present disclosure, error may be created in the determination of the timing of the ball or other object or fluid being measured enters or exits the active window and by a ball or other object or fluid being measured traveling at an angle through the window.

Using systems and methods as described herein, a computer system may account for an angle of a travelling object or fluid which is in contrast to other methods such as counting frames and the use of radar which are limited to a single dimension. For example, if the number of frames crossing the active window is uncertain by even one frame, the error created may be as high as 3.8% for the data measured. It can be stated that the present methods and systems are more accurate than contemporary methods by this testing methodology, but the absolute accuracy cannot be ascertained.

TABLE 1 average error of a contemporary method as compared to an exemplary method for six pitches.

| Frames | Velocity (ft/s) | Velocity (mph) | Contemporary Method | Contemporary Error | Exemplary Method | Exemplary Error |
|---|---|---|---|---|---|---|
| 29 | 108.80 | 74.18 | 71 | 3.18 | 73.4 | 0.78 |
| 26 | 121.36 | 82.74 | 78 | 4.74 | 81.5 | 1.24 |
| 27 | 116.86 | 79.68 | 76 | 3.68 | 78.5 | 1.18 |
| 27 | 116.86 | 79.68 | 75 | 4.68 | 76.5 | 3.18 |
| 27 | 116.86 | 79.68 | 75 | 4.68 | 78.0 | 1.68 |
| 27 | 116.86 | 79.68 | 75 | 4.68 | 77.0 | 2.68 |
|  |  |  |  | Average: 4.27 |  | Average: 1.79 |

In certain embodiments, an algorithm may consist of using two algorithms, correlation and frame differencing combined in a novel way.

Correlation

The relative displacement between objects in two pairs (or groups) of video frames can be determined by using correlation or convolution. Correlation and convolution are similar mathematical processes. The position of maximum correlation may correspond to a shift of an object from a first frame to a second frame. Velocity of the object may be determined with appropriate scaling after dividing by the frame rate. Such methodology may be used to track a dominant object moving from one frame to the next. Using correlation alone, if the camera is moved while the object moves, such that the entire background moves, the background may be tracked instead of the object will be what is tracked. Correlation and convolution can be calculated directly; however, for a large number of pixels, correlation or convolution are more efficient calculated indirectly from a "fast" implementation of a discrete Fourier transform.

Frame Differencing

Frame differencing is the pixel by pixel subtraction of one frame of a video from a next frame in a video comprising a sequence of frames. If frames are close together in time, i.e., a video with a high framerate, only quickly changing objects such as a fast moving ball may be seen. A slowly changing background will tend toward a zero value. In some embodiments, first order frame differencing may be used while in other embodiments higher order frame differencing may be implemented. Higher order frame differencing uses a greater number of previous frames in the calculating of the difference between frames. The below equations, (1), show first, second and third order frame differencing, respectively, wherein $P_x$ represents the frame difference calculation, $P_i$ represents pixel values for a present frame, $P_{i-1}$ represents pixel values for a frame prior to the present frame, $P_{i-2}$ represents pixel values for a frame two frames prior to the present frame, etc. It should be appreciated that higher orders of frame differencing are possible.

$$P_x = P_i - P_{i-1} \text{ (first order)}$$

$$P_x = P_i - 2P_{i-1} + P_{i-2} \text{ (second order)}$$

$$P_x = P_i - 3P_{i-1} + 3P_{i-2} - P_{i-3} \text{ (third order)} \quad (1)$$

Figure 4:
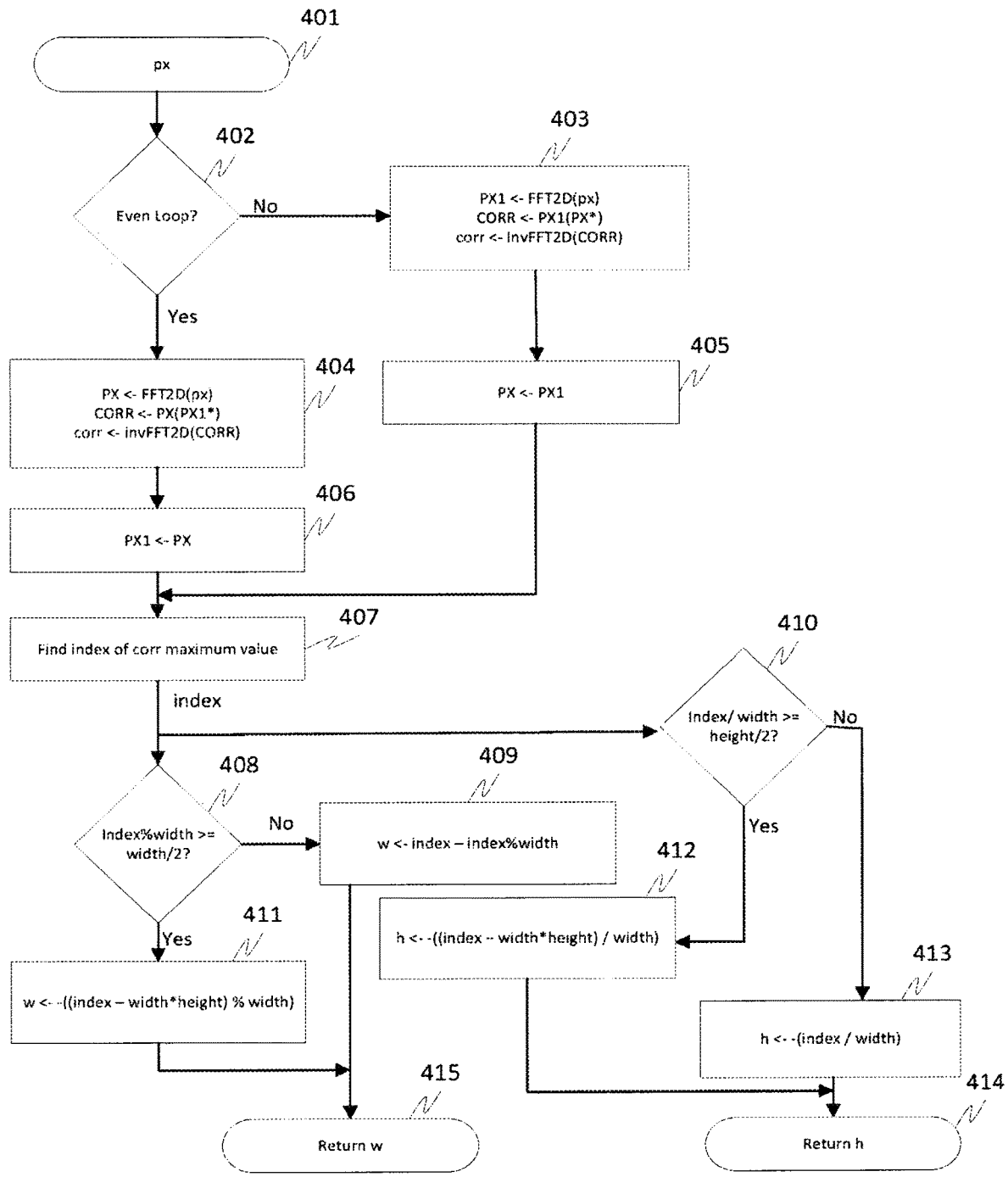
FIG. 4 is a flow chart of a method in accordance with one or more of the embodiments presented herein.

Correlation may be implemented in certain embodiments using a tracking function as illustrated by the flowchart of FIG. 4. FIG. 4 demonstrates pixel data ($P_x$) for a pair or group of frames after differencing has been performed (step 401). In step 402, a processor may determine whether the pixel data relates to an even loop or an odd loop. If the pixel data is an even loop, the method comprises proceeding to step 404 and if the data is an odd loop the method proceeds to step 403.

In step 404, a fast Fourier transform of $P_x$ is performed in and correlated with $P_{x1}$ which is the fast Fourier transform of the previous value of $P_x$. By switching between odd and even pathways, data does not need to be copied from $P_x$ to $P_{x1}$. Once the correlation has been performed the maximum value of the correlation is determined in step 406 for even loop pixel data or in step 405 for odd loop pixel data. The index of the maximum value is determined in step 407. In steps 408, 409, 411 the raw index is transformed into one linearly associated with the shift from one pair (or group) of frames to the next to return horizontal displacement (w) in step 415. In this way, a decoding algorithm may be performed. When the correlation is performed, a shift in position effectively wraps around the frame both horizontally and vertically. The algorithm of steps 408-411 effectively unwraps the shift in position. The algorithm of steps 408-411 is performed for vertical displacement (h) in steps 410, 412, 413 where the vertical displacement (h) is returned in step 414.

Each instance of the correlation algorithm as illustrated in FIG. 4 may run in its own thread. The algorithm may be highly accelerated by the use of APIs taking advantage of SIMD. The typical convention of all capitals is used for the Fourier transform of time-domain variables represented by all small case. In some embodiments, $P_X$ and $P_{X1}$ are static with memory being persistent from one call of the function to the next. Each time the function is called, a fast Fourier transform may be performed on an input array of pixel values (px). The fast Fourier transform may then be multiplied by a complex conjugate of the Fourier transform from a previous array of input pixel values to produce a product. The inverse Fourier transform of the product results in a correlation matrix. The maximum value of the correlation matrix represents the shift between a first image and a second image. The tracking function as illustrated in FIG. 4 may output vertical (h) and horizontal (w) displacements between the first and second images. In an exemplary embodiment, six instances of the algorithm may be implemented, though there may be more or less than six depending on the needs of a specific implementation.

In some embodiments, three instances (i.e., A1, A2, A3) may be used to track a foreground object (e.g. a baseball) after frame differencing has been applied and three implementations (i.e., B1, B2, B3) may be used to track the background without the use of frame differencing.

Combined Methods

Figure 5:
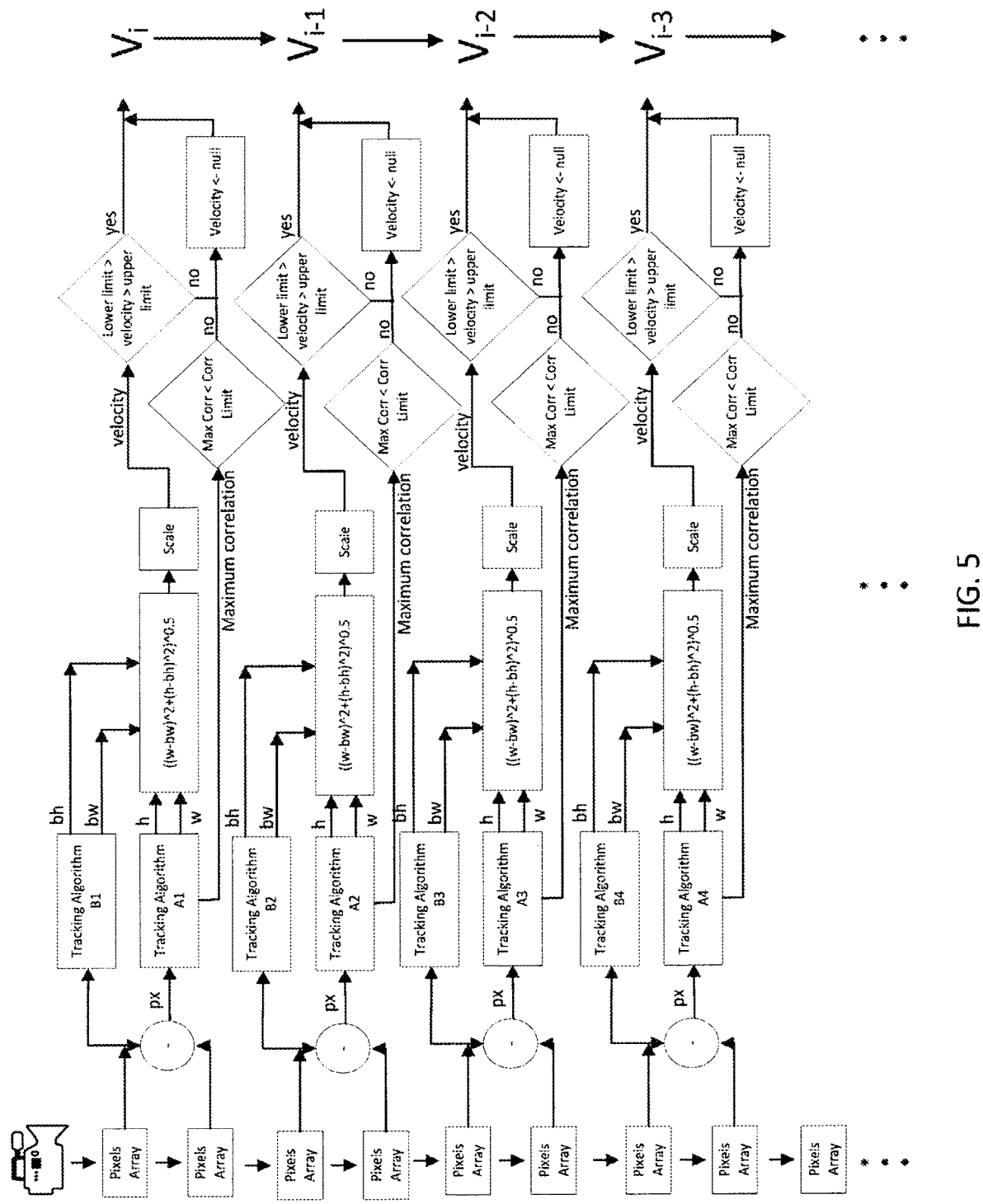
FIG. 5 is a flow chart of a method in accordance with one or more of the embodiments presented herein.

As illustrated, by the flowchart of FIG. 5, frame differencing may be performed on two or more pairs of video frames. Each frame of a pair of frames may be closely spaced in time, while each pair of the two or more pairs may be spaced further apart in time. For example, in some embodiments, the frames of each pair are taken 1/120 of a second apart (frame differencing rate), while the pairs of frames are 1/20 sec apart (tracking rate). The time difference between the pairs of frames may be determined by how often each instance of the tracking function is called. When frame differencing as illustrated in FIG. 5 is fed to the correlation algorithm (tracking function) illustrated in FIG. 4, a dominant, fast-moving object may be tracked while the background may be ignored or otherwise not tracked.

As shown in FIG. 5, a series of images is converted into a series of velocity measurements. If the velocity is out of range (i.e., too low or too high) or if the maximum value of the correlation matrix is below a tolerance value, the velocity measurement is rejected and replaced with a null value. In some embodiments, it may be assumed that velocity values preceded by three null values and followed by three null values represent valid velocity data. The median of all valid velocity data points may then be displayed. By using the median, the displayed speed may be more robust to erroneous data which might occur due to a visual obstruction such as fencing or netting.

Each of the images or sets of pixel data may be generated by camera hardware at a specific frame rate. Frame differencing may be used to determine changes between adjacent frame rates. In the implementation illustrated in FIG. 5, three tracking functions (e.g., A1, A2, and A3 as described above) are each used to retain recalculated Fourier transfers from previous function call for efficiency. Three additional tracking functions (e.g., B1, B2, and B3 as described above) are used without frame differencing to track the background movement.

The correlation algorithm may also be used for frames that do not undergo frame differencing. In this way, the apparent background movement induced by camera movement may be determined. The background movement may then be subtracted from the fast-moving object tracking. By subtracting the background movement, the algorithm is enabled to be used from a handheld device and not limited to being used only by a stationary camera which is a great advantage of the present system as compared to contemporary systems.

Error Tolerance Analysis

Figure 6:
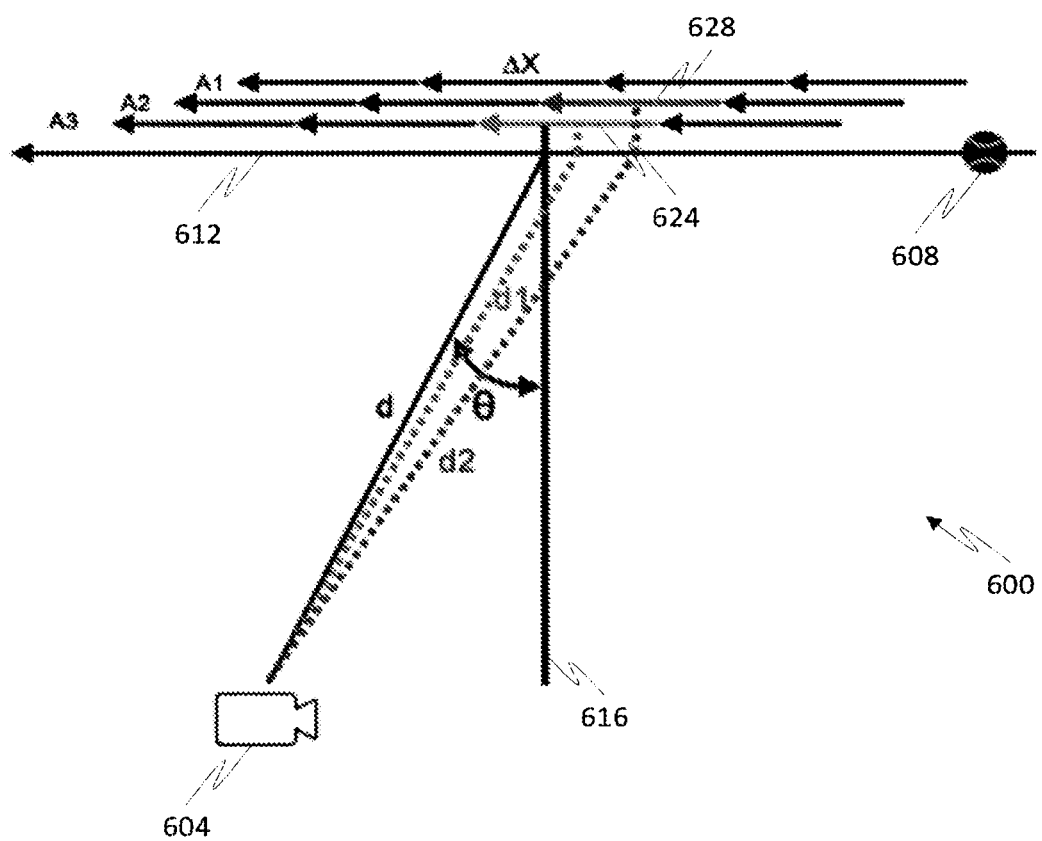
FIG. 6 is an illustration of a velocity tracking system tracking a velocity of a baseball in accordance with one or more of the embodiments presented herein.
Figure 7:
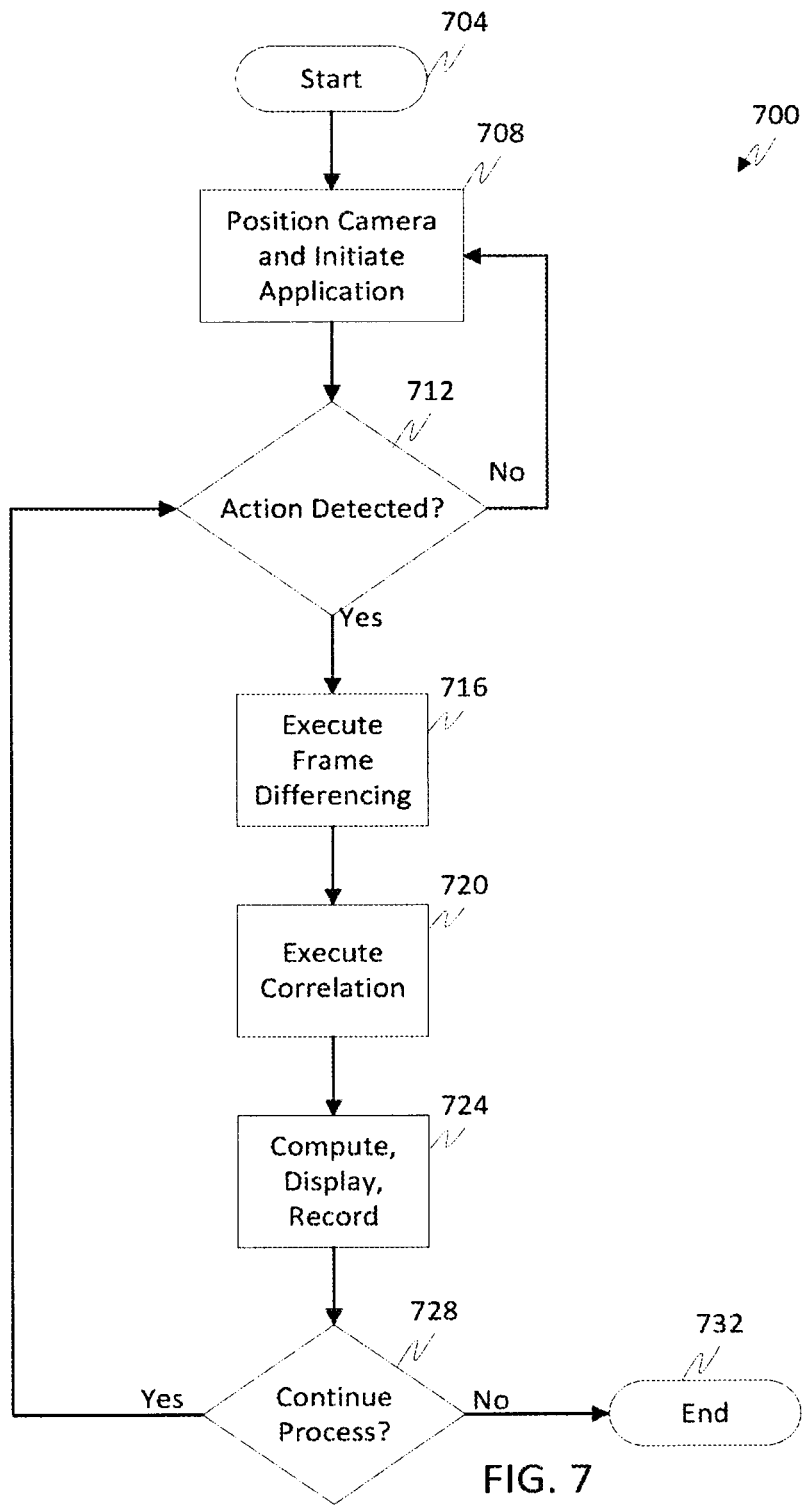
FIG. 7 is a flow chart of a method in accordance with one or more of the embodiments presented herein.

Cameras set at off-angles (e.g., not at precisely 90 degrees from the movement) and/or with visually-obstructed views (e.g., behind fencing or netting) can affect the accuracy of velocity measurements. Such a scenario 600 is illustrated in FIG. 6, in which a camera system 604 is being used to track a velocity of a baseball 608 traveling along a path 612. The ideal placement of the camera system 604 would be along the line 616 at ninety degrees from the center of the path 612. The camera system 604 illustrated in FIG. 6, however, is along a second line 620 which is θ° off of the line 616 and at a distance, d, away from the midpoint of the center of the line 616. The following is an estimation of the theoretical error in these calculations.

Three simultaneous tracking functions (A1, A2, A3) take overlapping measurements of displacement represented by each of the arrows illustrated in FIG. 6. The most disadvantageous alignment occurs when one tracking function (for example A2 in FIG. 6) starts or just finishes a measurement at the center of the active window. The closest tracking function measurement to center of the active window is then represented by the arrow 624. If the view is obstructed, preventing more favorable measurement displacements from being used, the closest measurement could be offset from the center of the active window as represented by the arrow 628. In each of these cases, the actual distance to the measured displacement (d1, d2) will be different from the expected distance (d).

The error of an off-angle measurement with the most unfavorable alignment can be estimated by determining the difference between the actual distance (d1) to the displacement as compared to the ideal distance (d), given by equation 2 below. These errors are calculated in Table 2 below for velocities varying from 20 mph to 90 mph and angles varying from zero to 45 degrees.

$$\varepsilon \leq 1 - \frac{d}{\sqrt{\left(d\sin(\theta) + \frac{\Delta x}{6}\right)^2 + (d\cos(\theta))^2}} \qquad (2)$$

The error of an off-angle measurement with a visual obstruction and an unfavorable alignment causing the third-best displacement to be used is given by equation 3, below, and is calculated in Table 2.

$$\varepsilon \leq 1 - \frac{d}{\sqrt{\left(d\sin(\theta) + \frac{\Delta x}{2}\right)^2 + (d\cos(\theta))^2}} \qquad (3)$$

As can be appreciated from Table 2 and Table 3, a combination of high-velocity, a significant off-angle measurement, and a visual obstruction is required to create significant error in the measured velocity. This demonstrates the tolerance of the systems and methods described herein to less than optimal conditions.

TABLE 2

Theoretical error (measured in mph) caused by most unfavorable alignment of measurement displacements varying from 20 mph to 90 mph for off-angle alignments varying from zero to 45 degrees.

| 20 mph | 30 mph | 40 mph | 50 mph | 60 mph | 70 mph | 80 mph | 90 mph | |
|---|---|---|---|---|---|---|---|---|
| 0.00 | 0.00 | 0.00 | 0.00 | 0.01 | 0.01 | 0.01 | 0.01 | 0° |
| 0.03 | 0.05 | 0.07 | 0.08 | 0.10 | 0.12 | 0.14 | 0.16 | 5° |
| 0.06 | 0.10 | 0.13 | 0.16 | 0.20 | 0.23 | 0.26 | 0.30 | 10° |
| 0.09 | 0.14 | 0.19 | 0.24 | 0.29 | 0.34 | 0.39 | 0.44 | 15° |
| 0.12 | 0.19 | 0.25 | 0.31 | 0.38 | 0.44 | 0.50 | 0.57 | 20° |
| 0.15 | 0.23 | 0.31 | 0.39 | 0.46 | 0.54 | 0.62 | 0.70 | 25° |
| 0.18 | 0.27 | 0.36 | 0.46 | 0.55 | 0.64 | 0.73 | 0.82 | 30° |
| 0.21 | 0.31 | 0.42 | 0.52 | 0.63 | 0.73 | 0.83 | 0.94 | 35° |
| 0.23 | 0.35 | 0.47 | 0.58 | 0.70 | 0.82 | 0.93 | 1.05 | 40° |
| 0.26 | 0.38 | 0.51 | 0.64 | 0.77 | 0.90 | 1.02 | 1.15 | 45° |

TABLE 3

Theoretical error (measured in mph) caused by most unfavorable alignment and a partial visual obstruction of measurement displacements varying from 20 mph to 90 mph for off-angle alignments varying from zero to 45 degrees.

| 20 mph | 30 mph | 40 mph | 50 mph | 60 mph | 70 mph | 80 mph | 90 mph | |
|---|---|---|---|---|---|---|---|---|
| 0.01 | 0.01 | 0.03 | 0.04 | 0.06 | 0.08 | 0.11 | 0.13 | 0° |
| 0.10 | 0.16 | 0.22 | 0.28 | 0.34 | 0.41 | 0.48 | 0.56 | 5° |
| 0.20 | 0.30 | 0.40 | 0.51 | 0.62 | 0.73 | 0.85 | 0.97 | 10° |
| 0.29 | 0.44 | 0.59 | 0.74 | 0.89 | 1.05 | 1.21 | 1.37 | 15° |
| 0.38 | 0.57 | 0.76 | 0.96 | 1.16 | 1.36 | 1.56 | 1.76 | 20° |
| 0.46 | 0.70 | 0.93 | 1.17 | 1.41 | 1.65 | 1.89 | 2.13 | 25° |
| 0.55 | 0.82 | 1.10 | 1.37 | 1.65 | 1.93 | 2.20 | 2.48 | 30° |
| 0.63 | 0.94 | 1.25 | 1.56 | 1.88 | 2.19 | 2.50 | 2.81 | 35° |
| 0.70 | 1.05 | 1.40 | 1.74 | 2.09 | 2.43 | 2.78 | 3.12 | 40° |
| 0.77 | 1.15 | 1.53 | 1.91 | 2.28 | 2.66 | 3.03 | 3.40 | 45° |

Implementation of an Exemplary Embodiment

As an illustration of an exemplary embodiment, the presently described systems and methods may be used to track a velocity of a pitched baseball. A user using a computing device such as an iPhone or iPad or other type of smartphone or tablet may position him or herself perpendicular to the direction of the pitched, thrown, or batted ball. For example, during a game, the ideal place to stand may be on the 1st base or 3rd base side in foul territory. For the best results, the user may be instructed to stand as close as possible while using minimal zoom.

To continue the example with the use of an iPad or iPhone, to track the velocity of the thrown pitch, the user may hold the iPhone or iPad with two hands and use his or her thumbs to zoom so that one distance mark is aligned with the pitching rubber and the other is aligned with the front edge of home plate as illustrated by the user interface 300 of FIG. 3. The user may alternatively align the user interface perpendicular to the base paths with one distance mark on each base.

Next, the user may tap the distance display and select a distance, for example by scrolling to the distance from the pitching rubber to home plate. Commonly used pitching distances for baseball and softball are available as well as the distances between bases and may be preprogrammed into the application.

To focus, the user may tap the screen anywhere that is not a graphical user interface button.

The ball speed may automatically be tracked and measured as the ball moves through the active window. In at least some embodiments, the direction of the ball does not matter. Upon the velocity of the ball being detected and measured, the speed may be displayed, for example for five seconds before automatically resetting to zero.

Algorithm Variation Description

In some embodiments, an algorithm may be implemented to improve velocity determination of an object or fluid from video input while adjusting for apparent background motion due to movement of the camera itself. For example, a specific application of such an algorithm as used in certain embodiments may be for the determination of the velocity of a thrown baseball. However, it should be appreciated that the algorithm is not limited to measuring velocity of baseballs and could be utilized to determine the velocity of any projectile in sports (e.g., tennis balls, hockey pucks, javelins, etc.) or any object (automobiles, wind speed by measuring dust or other particles, etc.).

As described herein, multiple possible implementations of the basic algorithm exist. In some embodiments, such as for an iPhone and/or iPad platform, multiple optimizations may be used to allow for efficient execution of the algorithm. Such optimizations may include the use of accelerated API functions accessing single instruction multiple data ("SIMD") instructions. Ball speed may be measured as the ball passes through the active window. The size of the active window in some embodiments may be specifically chosen to correspond to radix-2 dimensions such that a fast Fourier transform may be executed quickly. All of the critical data may be stored consecutively in memory and referenced by pointer arithmetic to allow for rapid access. In some embodiments, an application may rely partially or heavily on multithreading.

In some embodiments, frame rate of the camera system, the time between consecutive frames for frame differencing, and the delay between consecutive calls to a particular tracking function (tracking rate) have all been hand optimized for ideal results. In the case of the current implementation for baseball, the frame rate for differencing is 120 Hz and the delay between calls to the tracking function corresponds to 20 Hz. Frame differencing is unlikely to work for well below 60 Hz for baseball. The tracking rate should be on the order of 5-10 times slower than the frame differencing rate. There is an inherent tradeoff between accuracy of an individual measurement with a slower tracking rate and a greater number of measurements leading to a more robust algorithm with a faster tracking rate.

Exemplary Features of Certain Embodiments

Any of the steps, functions, and operations discussed herein can be performed continuously and automatically.

The exemplary systems and methods of this disclosure have been described in relation to velocity tracking applications. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Certain embodiments of the above-described systems and methods may include a variety of different embodiments and features. For example, algorithms described herein may in some embodiments use a combination of frame differencing and correlation to determine movement of moving object and/or account for background movement to cancel the effect of camera shake. Such a feature may be used with a handheld device such as an iPhone or other smartphone or iPad or other tablet device.

The above-described systems for the storing and sharing of images and videos may be used in the case in which videos are automatically triggered such as when velocity is determined capturing video both before and after the triggering event.

In some embodiments, systems may provide an ability to adjust based on whether a ball or other object is being pitched, thrown, or batted, and for a wide variety of different distances over which measurement occurs. Similarly, some systems and methods as described herein may provide for velocity calculations when a ball leaves a player's hand as well as when a ball is caught by knowing the air density and using known equations of motion through a fluid (e.g., air).

Any above the calculations described herein may be adjusted to account for altitude and/or air pressure changes using an altitude reading from a GPS.

While certain frame rates are described herein, it should be appreciated that as technology advances, higher resolution video formats may be used. Higher frame rates may necessitate increasing a number of pixels in an active window which may increase a size of arrays being processed with the tracking algorithm.

The above-described computer systems may further include system diagnostic software such that hardware detection may be implemented to check whether the software can be adequately run by the computer system. As newer hardware is introduced, such checks may be expanded to optimize the algorithm accordingly.

The above-described systems for measuring and/or estimating a velocity of a traveling object and/or fluid may be used in conjunction with a variety of use cases. For example, participants of a large number of sporting events may find object velocity measurements useful, such as alpine skiing, animal racing, baseball, basketball, birdwatching, bobsledding, boxing, car racing, cricket, curling, cycling, discus, dog racing, field hockey, football, golf, horse racing, ice hockey, javelin, lacrosse, luge, martial arts, pole vault, shot-put, softball, speed skating, sprints, squash, swimming, tennis, and/or track and field. Other uses may include defense department applications such as aiming devices, aircraft speed detection, missile velocity, muzzle velocity, projectile velocity, and/or threat detection. Automotive uses may include automated speed cameras, automated driver aids, driverless automobiles, and/or law enforcement speed guns. Scientific uses may include cellular motion, dust/wind speed, and/or microscopic motion.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a computer-implemented method for determining a velocity of a fluid or an object, the method comprising performing operations as follows on a processor of a computer: receiving image data of the fluid or the object, the image data comprising a plurality of frames, wherein each frame comprises an array of pixel values; creating an image using frame differencing by: subtracting an array of pixel values for a first frame of the image data from an array of pixel values for a second frame of the image data, or subtracting the array of pixel values for the second frame of the image data from the array of pixel values for the first frame of the image data; utilizing the image created with frame differencing to determine a location of the object or one or more objects within the fluid; utilizing a correlation or a convolution to determine a distance traveled by the object or the one or more objects within the fluid between two or more frames; and based on the distance traveled by the object or the one or more objects within the fluid, automatically determine the velocity of the fluid or the object.

Aspects of the above method include wherein creating the image using frame differencing comprises implementing second, third, or higher order frame differencing, wherein second order frame differencing comprises using three frames to create the image and third order frame differencing comprises using four frames to create the image.

Aspects of the above method include the method further comprising creating a correlation matrix by performing fast Fourier transforms on the array of pixel values for the first frame of the image data and the array of pixel values for the second frame of the image data.

Aspects of the above method include wherein the velocity of the object is determined in real-time and displayed in a graphical user interface in communication with the computer.

Aspects of the above method include wherein the object is a ball.

Aspects of the above method include wherein the object is a baseball.

Aspects of the above method include wherein the image data is stored in memory as a video.

Aspects of the above method include the method further comprising detecting a beginning and an end to a movement of the fluid or the object, wherein detecting the beginning of the movement of the fluid or the object triggers a beginning to the video and detecting the end to the movement of the object triggers an end to the video.

Aspects of the above method include the method further comprising detecting the fluid or the object.

Aspects of the above method include wherein detecting the fluid or the object depends on a speed range of the object.

Aspects of the above method include wherein the speed range of the object or the fluid is between 20 miles per hour and 115 miles per hour.

Aspects of the above method include wherein detecting the fluid or the object depends on a degree of correlation.

Aspects of the above method include wherein background image movement is tracked and subtracted from the movement of the object or fluid.

Aspects of the above method include wherein one or more of peak velocity or initial velocity of the object is calculated from a formula describing decline due to resistance.

Aspects of the above method include wherein the one or more of peak velocity or initial velocity of the object is displayed with or in place of an actual measured speed of the object.

Embodiments include a system comprising: a processor; and a computer-readable storage medium storing computer-readable instructions which, when executed by the processor, cause the processor to perform steps comprising: receiving image data of the fluid or the object, the image data comprising a plurality of frames, wherein each frame comprises an array of pixel values; creating an image using frame differencing by subtracting an array of pixel values for a first frame of the image data from an array of pixel values for a second frame of the image data; utilizing the image created with frame differencing to determine a location of the object or one or more objects within the fluid; utilizing a correlation or a convolution to determine a distance traveled by the object or the one or more objects within the fluid between two or more frames; and based on the distance traveled by the object or the one or more objects within the fluid, automatically determine the velocity of the fluid or the object.

Aspects of the above system include wherein creating the image using frame differencing comprises implementing second or third order frame differencing, wherein second order frame differencing comprises using three frames to create the image and third order frame differencing comprises using four frames to create the image.

Aspects of the above system include the system further comprising creating a correlation matrix by performing fast Fourier transforms on the array of pixel values for the first frame of the image data and the array of pixel values for the second frame of the image data.

Embodiments include a computer program product comprising: a non-transitory computer readable storage medium having computer readable program code embodied therewith, the computer readable program code configured when executed by a processor to perform steps comprising: receiving image data of the fluid or the object, the image data comprising a plurality of frames, wherein each frame comprises an array of pixel values; creating an image using frame differencing by subtracting an array of pixel values for a first frame of the image data from an array of pixel values for a second frame of the image data; utilizing the image created with frame differencing to determine a location of the object or one or more objects within the fluid; utilizing a correlation or a convolution to determine a distance traveled by the object or the one or more objects within the fluid between two or more frames; and based on the distance traveled by the object or the one or more objects within the fluid, automatically determine the velocity of the fluid or the object.

Aspects of the above computer program product include wherein creating the image using frame differencing comprises implementing second, third, or higher order frame differencing, wherein second order frame differencing comprises using three frames to create the image and third order frame differencing comprises using four frames to create the image.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A computer-implemented method configured to determine a velocity of a fluid or an object comprising:
   receiving image data for the fluid or the object, the image data comprising a plurality of frames, wherein each frame comprises an array of pixel values;
   creating an image using frame differencing by:
      subtracting an array of pixel values for a frame of the image data from an array of pixel values for another frame of the image data;
   utilizing the image created with frame differencing to determine a location of the object or one or more objects within the fluid;
   utilizing a correlation or a convolution to determine a distance traveled by the object or the one or more objects within the fluid between two or more frames; and
   based on the distance traveled by the object or the one or more objects within the fluid, automatically determining and outputting on a display the velocity of the fluid or the object.

2. The method of claim 1, wherein creating the image using frame differencing comprises implementing second, third, or higher order frame differencing, wherein second order frame differencing comprises using three frames to create the image and third order frame differencing comprises using four frames to create the image.

3. The method of claim 1, further comprising creating a correlation matrix of two groups of frames separated in time where frame differencing has been applied with a maximal correlation value used to determine a frame shift or distance travelled.

4. The method of claim 3, wherein creating the correlation matrix comprises utilizing a discrete Fourier Transform.

5. The method of claim 3, wherein creating the correlation matrix comprises utilizing a fast Fourier Transform.

6. The method of claim 1, wherein the velocity of the object is determined in real-time and displayed in a graphical user interface in communication with the computer.

7. The method of claim 1, wherein the object is a ball.

8. The method of claim 1, wherein the object is a baseball.

9. The method of claim 1, wherein the image data is stored in memory as a video.

10. The method of claim 9, further comprising detecting a beginning and an end to a movement of the fluid or the object, wherein detecting the beginning of the movement of the fluid or the object triggers a beginning to the video and detecting the end to the movement of the object triggers an end to the video.

11. The method of claim 1, further comprising detecting the fluid or the object.

12. The method of claim 11, wherein detecting the fluid or the object depends on a speed range of the object.

13. The method of claim 12, wherein the speed range of the object or the fluid is between 20 miles per hour and 115 miles per hour.

14. The method of claim 11, wherein detecting the fluid or the object depends on a degree of correlation.

15. The method of claim 1, wherein background image movement is tracked and subtracted from the movement of the object or fluid.

16. The method of claim 1, wherein one or more of peak velocity or initial velocity of the object is calculated from a formula describing decline due to resistance.

17. The method of claim 16, wherein the one or more of peak velocity or initial velocity of the object is displayed with or in place of an actual measured speed of the object.

18. A system comprising:
a processor;
a display; and
a computer-readable information storage medium storing non-transitory computer-readable instructions which, when executed by the processor, cause the processor to perform a process comprising:
receiving image data for the fluid or the object, the image data comprising a plurality of frames, wherein each frame comprises an array of pixel values;
creating an image using frame differencing by subtracting an array of pixel values for a frame of the image data from an array of pixel values for another frame of the image data;
utilizing the image created with frame differencing to determine a location of the object or one or more objects within the fluid;
utilizing a correlation process or a convolution process to determine a distance traveled by the object or the one or more objects within the fluid between two or more frames; and
based on the distance traveled by the object or the one or more objects within the fluid, automatically determining and outputting on the display the velocity of the fluid or the object.

19. The system of claim 18, wherein creating the image using frame differencing comprises implementing second or third order frame differencing, wherein second order frame differencing comprises using three frames to create the image and third order frame differencing comprises using four frames to create the image.

20. The system of claim 18, wherein the system is a smartphone.

21. A computer program product comprising:
a non-transitory computer readable information storage medium having computer readable program code embodied therewith, the computer readable program code configured, when executed by a processor, to perform a process comprising:
receiving image data for the fluid or the object, the image data comprising a plurality of frames, wherein each frame comprises an array of pixel values;
creating an image using frame differencing by subtracting an array of pixel values for a frame of the image data from an array of pixel values for another frame of the image data;
utilizing the image created with frame differencing to determine a location of the object or one or more objects within the fluid;
utilizing a correlation or a convolution to determine a distance traveled by the object or the one or more objects within the fluid between two or more frames; and
based on the distance traveled by the object or the one or more objects within the fluid, automatically determining and outputting to a display the velocity of the fluid or the object.

\* \* \* \* \*